No. 710,573. Patented Oct. 7, 1902.
C. S. GRINDELL.
WHIFFLETREE HOOK.
(Application filed Feb. 17, 1902.)
(No Model.)

WITNESSES:
F. A. Barron
O. E. Murray

INVENTOR
Chas. S. Grindell
BY
Milo B. Stevens & Co.
ATTORNEYS

UNITED STATES PATENT OFFICE.

CHARLES SHERMAN GRINDELL, OF CLAIBORNE, OHIO.

WHIFFLETREE-HOOK.

SPECIFICATION forming part of Letters Patent No. 710,573, dated October 7, 1902.

Application filed February 17, 1902. Serial No. 94,479. (No model.)

*To all whom it may concern:*

Be it known that I, CHARLES SHERMAN GRINDELL, a citizen of the United States, residing at Claiborne, in the county of Union and State of Ohio, have invented certain new and useful Improvements in Whiffletree-Hooks; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to whiffletree-hooks; and the object thereof is to form a trace-fastener over which the end of the trace may be easily slipped in the act of attaching or detaching the same.

The invention consists, generally speaking, of a whiffletree having a slot through which works an elbow of a spring-catch inclined in both directions, so that the trace may be easily and quickly slipped on or off.

Figure 1:
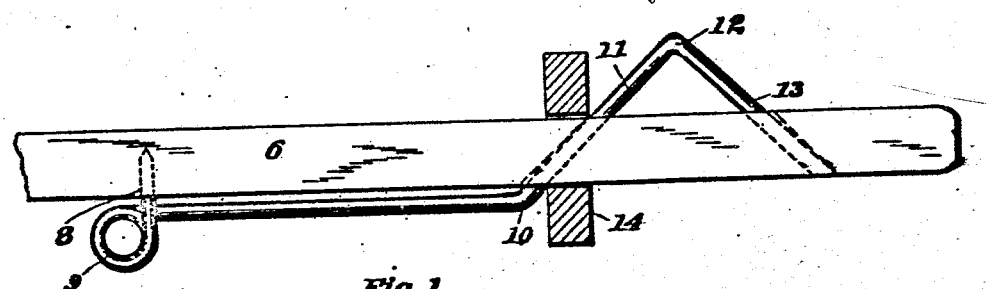
Figure 3:
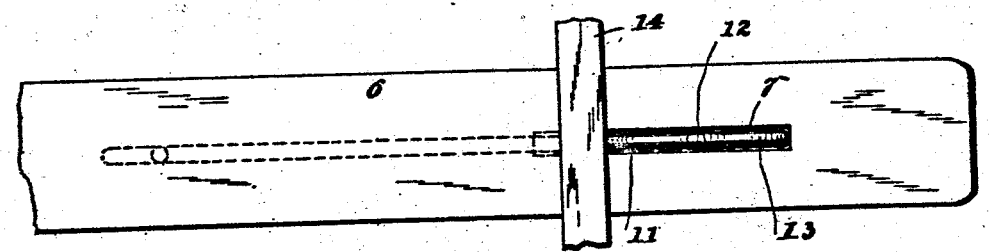
Figure 2:
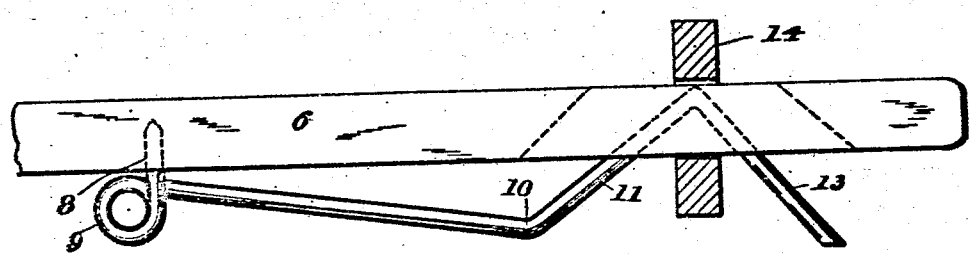

In the accompanying drawings, Figure 1 is a side view of one end of a whiffletree and the holder attached thereto with the trace shown in section. Fig. 2 is a similar view showing the action of the catch when the trace is being attached or detached. Fig. 3 is a top plan view.

Referring specifically to the drawings, the whiffletree is indicated at 6, having a slot 7, through which the elbow of the spring-catch works. The catch is preferably formed of stout wire, one end of which is attached to the tree by being driven therein, as at 8. At this end of the wire a coil 9 is formed to give elasticity. Thence the wire extends outwardly along the tree to the slot, where it is bent, as at 10, to pass therethrough and to form an inclined portion 11, extending normally above or beyond the top of the whiffletree to a bend 12, whence the wire terminates in an oppositely-inclined portion 13, the end of which extends within but not through the slot. The trace is indicated at 14.

The operation of the device is obvious. To attach the trace, it is slipped onto the end of the tree and pushed against the incline 13, which forces the catch down, as shown in Fig. 2, allowing the trace to pass the elbow and against the incline 11 to the position shown in Fig. 1. To detach the trace, the operation is reversed. The spring is operated by the trace, and it is not necessary to operate the same by hand to slip the trace on or off.

What I claim is—

1. The combination with a slotted tree, of a spring attached to one side of the tree and having an inclined trace-holding portion extending through the slot and yieldingly beyond the other side of the tree.

2. The combination with a slotted tree, of a spring attached to one side of the tree and having a double-inclined retaining-elbow extending through the slot and yieldingly beyond the other side of the tree.

3. The combination with a slotted tree, of a spring-wire attached at its inner end to the tree, bent to form an elbow extending through the slot and yieldingly beyond the other side of the tree, and terminating in a free outer end normally within the slot.

In testimony whereof I affix my signature in presence of two witnesses.

CHARLES SHERMAN GRINDELL.

Witnesses:
 CHAS. WILLIAMS,
 J. W. BAUGHMAN.